(12) United States Patent
Qu et al.

(10) Patent No.: US 8,989,048 B2
(45) Date of Patent: Mar. 24, 2015

(54) NODE SYSTEM ID CHANGE IN LINK STATE PROTOCOL NETWORK

(71) Applicant: Hangzhou H3C Technologies, Co., Ltd., Hangzhou (CN)

(72) Inventors: Weiliang Qu, Beijing (CN); Wan Zhou, Beijing (CN)

(73) Assignee: Hangzhou H3C Technologies Co., Ltd., Zhejiang (CN)

( * ) Notice: Subject to any disclaimer, the term of this patent is extended or adjusted under 35 U.S.C. 154(b) by 128 days.

(21) Appl. No.: 13/925,565

(22) Filed: Jun. 24, 2013

(65) Prior Publication Data

US 2014/0086097 A1    Mar. 27, 2014

(30) Foreign Application Priority Data

Sep. 25, 2012    (CN) .......................... 2012 1 0360984

(51) Int. Cl.
*H04L 12/28*    (2006.01)
*H04L 12/24*    (2006.01)
*H04L 12/751*    (2013.01)
*H04L 12/723*    (2013.01)

(52) U.S. Cl.
CPC .............. *H04L 41/12* (2013.01); *H04L 45/026* (2013.01); *H04L 45/50* (2013.01)
USPC ......................................................... 370/254

(58) Field of Classification Search
None
See application file for complete search history.

(56) References Cited

U.S. PATENT DOCUMENTS 5,251,205 A  * 10/1993  Callon et al. ................... 370/392
6,587,475 B1 *  7/2003  Przygienda .................... 370/465
2009/0279536 A1* 11/2009  Unbehagen et al. .......... 370/352

* cited by examiner

*Primary Examiner* — Frank Duong
(74) *Attorney, Agent, or Firm* — Mannava & Kang, P.C.

(57) ABSTRACT

According to an example, a change of a system ID for a node in a link state protocol network is notified to other nodes in the network. A message may be sent to notify the other nodes of the system ID change.

15 Claims, 5 Drawing Sheets

NODE SYSTEM ID CHANGE IN LINK STATE PROTOCOL NETWORK

CLAIM FOR PRIORITY

The present application claims priority under 35 U.S.C 119 (a)-(d) to Chinese Patent application number 201210360984.5, filed on Sep. 25, 2012, which is incorporated by reference herein in its entirety.

BACKGROUND

A link state routing protocol is a routing protocol used in packet switching networks. Examples of link state routing protocols include open shortest path first (OSPF) and intermediate system to intermediate system (IS-IS). For link state routing, the nodes construct a map of the connectivity to the network, e.g., in the form of a graph, showing which nodes are connected to which other nodes. Each node may then independently calculate best paths from it to every possible destination in the network. The collection of best paths forms the node's routing table.

Link state messages from the nodes are propagated throughout the network so the nodes can determine the connectivity of all other nodes in the network to build a map of the network. A node may detect a change in topology of the network, such as in response to a failed link. The node can send link state messages in the network to inform other nodes of the topology change so the map and best paths can be recomputed at each node.

BRIEF DESCRIPTION OF DRAWINGS

Embodiments are described in detail in the following description with reference to examples shown in the following figures.

DETAILED DESCRIPTION OF EMBODIMENTS

Figure 1:
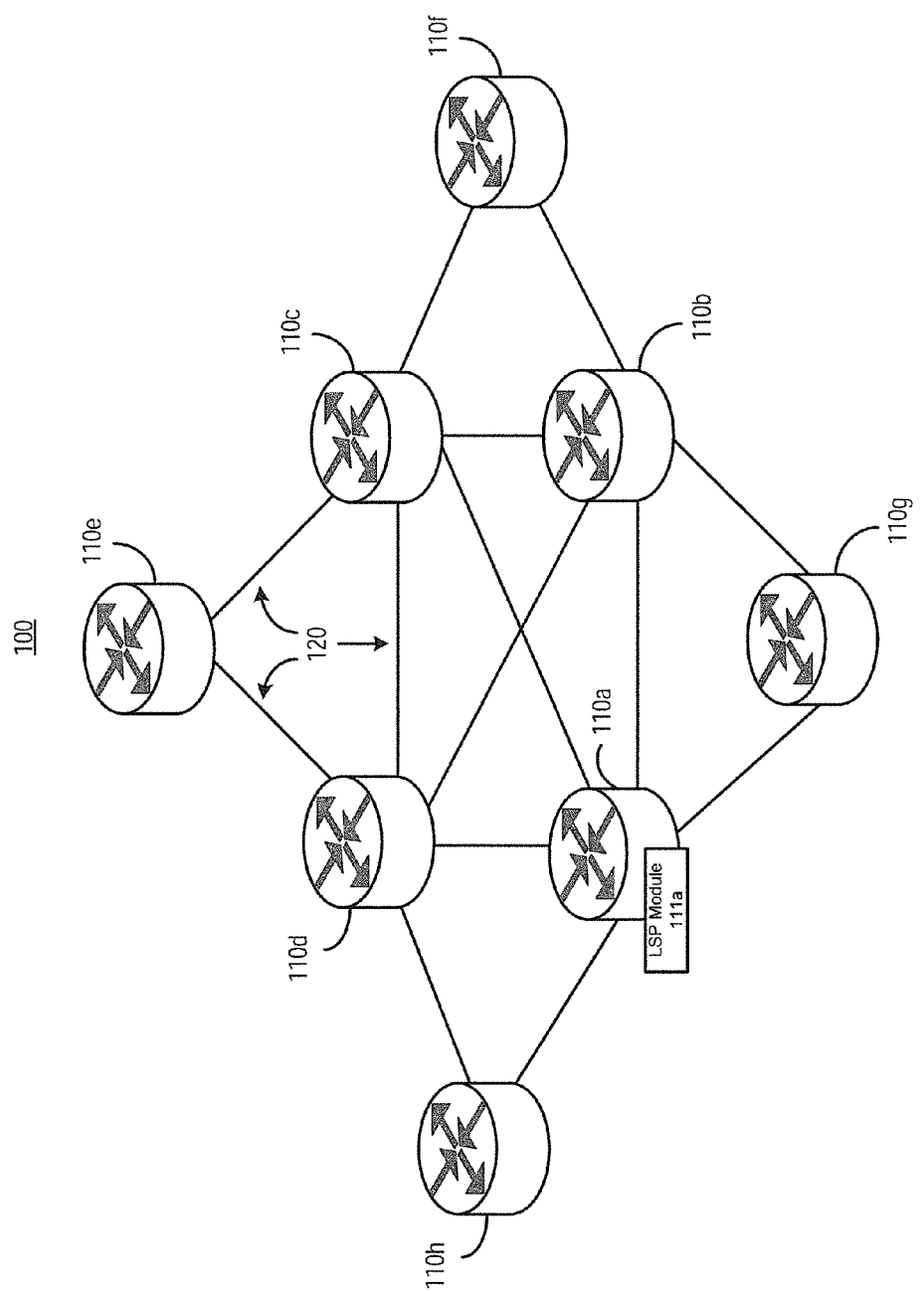
FIG. 1 illustrates an example network.

For simplicity and illustrative purposes, the principles of the embodiments are described by referring mainly to examples thereof. In the following description, numerous specific details are set forth in order to provide a thorough understanding of the embodiments. It is apparent that the embodiments may be practiced without limitation to all the specific details. Also, the embodiments may be used together in various combinations.

Nodes in a network may use a link state routing protocol to route packets in the network. The nodes may determine connectivity to other nodes in the network and calculate best paths to each node for routing. If an ID of a node changes, the other nodes in the network are informed of the new ID without causing the other nodes to recompute the topology of the network, thus avoiding traffic disruption caused by a topology change.

In one example, the link state routing protocol used by the nodes is the intermediate system to intermediate system (IS-IS) protocol. IS-IS is an Interior Gateway Protocol (IGP) defined in International Organization for Standardization (ISO)/International Engineering. Consortium (IEC) 10589 and in Internet Standard RFC 1142 published by the Internet Engineering Task Force (IETF). Using the IS-IS protocol, nodes can detect and inform each other of changes in the network topology and calculate loop-free routes to other nodes in the network. Each node maintains a link state table that describes the state of the network and a forwarding table for routing.

The nodes each have a unique system ID. In one example, the media access control (MAC) address of the node is used as its system ID. If a node's MAC address changes, its system ID changes to its new MAC address. The node informs other nodes in the network of the change of the system ID of the node through an IS-IS message without prompting a change in a topology of the network. An IS-IS message is a message that conforms to the IS-IS protocol, such as having header fields that conform to the IS-IS protocol. Examples of IS-IS messages are hello messages and link state messages. For example, hello packets are sent out to discover neighbor nodes. Link state messages are periodically sent to advertise or identify link state updates to update a local link state table. Each node generates link state messages which capture local link-state information describing connected links, neighbor nodes, subnets, related metric information, and so forth. Copies of the link state messages are distributed to nodes in a specific area for example through flooding. A link state protocol data unit (LSP) is a link state message that may be used to provide link state information. The LSP includes a fixed header and a variable portion. The fixed header includes fields such as LSP Identifier (ID), Remaining Lifetime, Sequence Number, Checksum, etc. The LSP ID indicates the owner of the LSP, such as the node that originally sent the LSP to advertise its link state. The LSP ID includes a System identifier (SysID) of the originating node, which may be its MAC address. The LSP ID also includes a Pseudonode (PSN) identifier, which is 0 for a non-PSN LSP and nonzero for a PSN LSP. The LSP ID also includes an LSP number which denotes LSP fragments. LSPs may be sent as packets in the network. A node tags an LSP that it generates with a sequence number to differentiate newer copies from older ones. The LSP sequence number may be increased by 1 whenever a new LSP is generated to replace an old one. New LSPs are issued when changes occur in local surroundings of the node that need to be reported to the rest of the network. Also, a node periodically issues a new LSP with the same information as the previous LSP, just to refresh an LSP before it expires. The remaining lifetime is a time interval until expiration of an LSP. An LSP ages from the time that it is generated. If a node does not receive a refresh LSP before the end of the LSP lifetime, the node deletes the link described by the LSP from its link state table.

According to an example, to inform of a node system ID change, the IS-IS message may include a system ID type-length-value (TLV), which is a new type of TLV not known in the art. A TLV is used to specify optional information. In IS-IS, a fixed part of the header contains fields that are always present, and a variable part of the header may contain a TLV which permits the flexible encoding of parameters. The system ID TLV includes the old system ID (e.g., old MAC address) and the new system ID (e.g., new MAC address). For example, the system ID TLV includes a system ID field and an auxiliary system ID field. When the MAC address changes, the new system ID (e.g., new MAC address) is included in the system ID field, and the old system ID (e.g., the old MAC address) is included in the auxiliary system ID field. Also, the old system ID is included in the fixed part of the header of the message.

A node receiving the IS-IS message with the system ID TLV parses the system ID TLV to determine the new system ID of the node and updates its link state table with the new system ID. Then, when the node with the changed system ID starts sending LSPs using its new system ID in the fixed header, the node receiving the message already knows the new system ID. Because the new system ID of the node is known, a topology change is not invoked.

In one example, the nodes may use Shortest Path Bridging (SPB) to determine routing paths based on the link states. SPB is one of the Ethernet standards defined by IEEE 802.1aq and is a further extension of the multiple spanning tree protocol (MSTP). SPB uses IS-IS to share link states in the network. Nodes in the network compute in parallel the shortest paths among the nodes.

802.1aq defines two SPB modes: a VLAN mode SPB (SPBV) and an M-in-M mode SPB (SPBM). SPBM inherits the message encapsulation format and multi-instance from 802.1ah but redefines the forwarding manner in the data plane and the control plane. SPB-IS-IS learns the link state information and synchronizes the information throughout the network to compute the forwarding path. SPBM does not dynamically learn MAC addresses and its forwarding entries are all learned and distributed by a control plane SPB-IS-IS. Functions of SPB-IS-IS include: establishing an IS-IS neighbor between SPB bridges and quickly updating and synchronizing a link state database; advertising Backbone Service Instance Identifier (I-SID) service instances and advertising load sharing algorithms; computing a topology SPT in parallel by nodes; and distributing the forwarding entries to the data plane.

In an SPB network where the IS-IS protocol is used (i.e., SPB-IS-IS), the node's MAC address is used as the node's system ID. If the MAC address of a node changes, SPB-IS-IS may assume a new node is in the network and/or an old node has failed, triggering a re-computation of the SPB network topology among the nodes which can cause a network traffic interruption. By first notifying other nodes of the change of the MAC address through the system ID TLV, a topology change may not be invoked, which avoids traffic disruption.

FIG. 1 shows an example of a network 100 including nodes 110a-h. The nodes include network switches. The nodes 110a-h for example are layer 2 switches, layer ⅔ switches or layer 3 switches (e.g., routers) where the layers refer to the Open Systems Interconnection (OSI) model. The network 100 may have any number of nodes.

The nodes 110a-n implement a link state routing protocol system to share link states and for routing packets in the network to their destination. In one example, the IS-IS protocol is used but other link state protocols may be used.

In one example, the nodes 110a-n include level 1 (intra-area), level 2 (inter-area) or level 1-2 (both inter and intra-area) network switches as defined by the IS-IS protocol. Routing information is exchanged between level 1 network switches and other level 1 network switches, and routing information is exchanged between level 2 network switches and other level 2 network switches. Level 1-2 network switches exchange information with both levels and are used to connect the inter-area routers with the intra-area routers. The topology of the network 100 may include a logical topology of a backbone of level 2 network switches with branches of level 1-2 and level 1 network switches forming the individual areas.

The nodes 110a-h use their MAC addresses as the IS-IS SysId (system ID) and each node joins a single IS-IS level and exchanges LSPs. The LSPs contain node information and link information such that every node learns the full topology of the network 100. Links 120 between the nodes 110a-h are shown as lines connecting the nodes 110a-h. The nodes 110a-h build a topological representation of the network 100 from the LSPs. This map indicates the subnets which each node can reach, and the lowest-cost (shortest) path to a subnet used to forward traffic.

An example is now described in which nodes 110a-c are neighbors to one another and node 110a senses a MAC address change within itself. Neighbors are nodes connected by one link. For example, nodes 110a-c are connected to each other by one link. Nodes 110a and 110e are connected by 2 links (i.e., multiple hops) and are not neighbors.

Node 110a detects a change of its system ID. For example, the node 110a uses its MAC address as its system ID (e.g., its SysID in LSPs) and detects a change in the MAC address and/or SysID. The node 110a sends an LSP carrying the system ID TLV. The system ID TLV includes the new system ID and the old system ID. The new MAC address is the new system ID and the old MAC address is the old system ID. The fixed header of the LSP includes the old system ID so any node receiving the LSP identifies the source as node 110a from previous link-state information stored for the node 110a. The source for example is the origin of the message. The LSP with the system ID TLV may be flooded or sent in hello messages to neighbors. The new MAC address is included in the system ID field of the system ID TLV, and the old MAC address is included in the auxiliary system ID field of the system ID TLV. Also, the old MAC address is included in the header of the message.

Node 110b receives the LSP sent by node 110a. If the auxiliary system ID carried in the system ID TLV in the LSP is the same as the system ID in the fixed header of the LSP, the node 110b updates its link state table to include the system ID from the system ID TLV as the system ID for the node 110a. For example, the new MAC address of the node 110a is carried in the system ID field of the system ID TLV and the node 110b updates its link state information to include the new system ID for the node 110a. The node 110b then forwards the LSP received from the node 110a to other nodes in the network 100. If the system ID TLV was carried in a hello message from the node 110a to its neighbors, then node 110b updates its neighbor link state information for node 110a.

If the auxiliary system ID carried in the system ID TLV is different from the system ID in the header of the LSP or hello message received from the node 110a, then the message is not processed by the node 110b or any nodes in the network 100 that may receive the message. The message may be deleted by the nodes receiving the message. For example, the message is considered as an attack message and is not processed and/or is deleted. Attack messages may be generated to gain unauthorized access to systems or to harm the performance of systems.

Assuming the auxiliary system ID carried in the system ID TLV in the LSP is the same as the system ID in the fixed header of the LSP, node 110b sends an LSP to node 110a to acknowledge the processing of the new system ID of node 110a in addition to the flooding of the received LSP to nodes 110c-h. When sending the LSP to node 110a, node 110b modifies an entry in a neighbor TLV to be the main system ID (i.e., the new MAC address of the node 110a), and sends the message carrying the neighbor TLV.

Node 110c also receives the LSP sent by node 110a and performs the same processing as node 110b. All neighbors of node 110a perform the same processing in response to receiving the LSP sent by node 110a.

Node 110a receives the LSP sent by node 110b and/or node 110c or any of its neighbors, and when the system ID carried by the neighbor TLV is the new system ID of node 110*a*, node 110*a* uses the new system ID to send a hello message and an LSP notification message to its neighbors including nodes 110*b* and 110*c*.

As discussed in the example above, when the MAC address change results in a change in the system ID, a node does not immediately use the changed MAC address as the system ID to send an LSP notification message and/or a hello message (i.e., it does not immediately send an LSP or hello message with the new system ID in the fixed header). Instead it informs other nodes in the network first to have them update the corresponding system ID, and then the node uses the new MAC address as the system ID to send the hello message and LSP. Thus no topology change is caused, and no re-computation of the topology is performed, and accordingly no traffic interruption is caused.

As discussed above, the system ID TLV may be provided in a hello message sent to neighbors and/or an LSP. In one example, if the system ID TLV is provided in a hello message, no other types of TLVs are carried in the hello message, except for the authentication TLV and the like that influence the examination of the legality or conformance of the hello message to the protocol or other rule. Likewise, if the system ID TLV is provided in the LSP, no other types of TLVs are carried in the hello message, except for the authentication TLV and the like that influence the examination of the legality or conformance of the hello message to the protocol or other rule such as a security rule.

As indicated above, if the node 110*b* receives the LSP from the node 110*a*, and the auxiliary system ID carried in the system ID TLV in the LSP is the same as the system ID in the header of the LSP, the node 110*b* may flood the received LSP to other nodes in the network and send an acknowledgement to the node 110*a*. The node 110*a*, after receiving the acknowledgement, stops sending an LSP that carries the system ID TLV. Otherwise, the node 110*a* may continue to periodically send the LSP with the system ID TLV. The nodes 110*a-h* may each include an LSP module. For example, LSP module 111*a* is shown for node 110*a*, but each of the nodes 110*a-h* may include an LSP module. The LSP module includes hardware to execute the functions described herein, including detecting a MAC address change, sending messages to notify of the change of a system ID (e.g., LSP or hello message with system ID TLV), and functions for responding to the messages, and other functions and methods described herein. The LSP module may include machine readable instructions executed by the hardware to perform the function and methods described herein.

Figure 2:
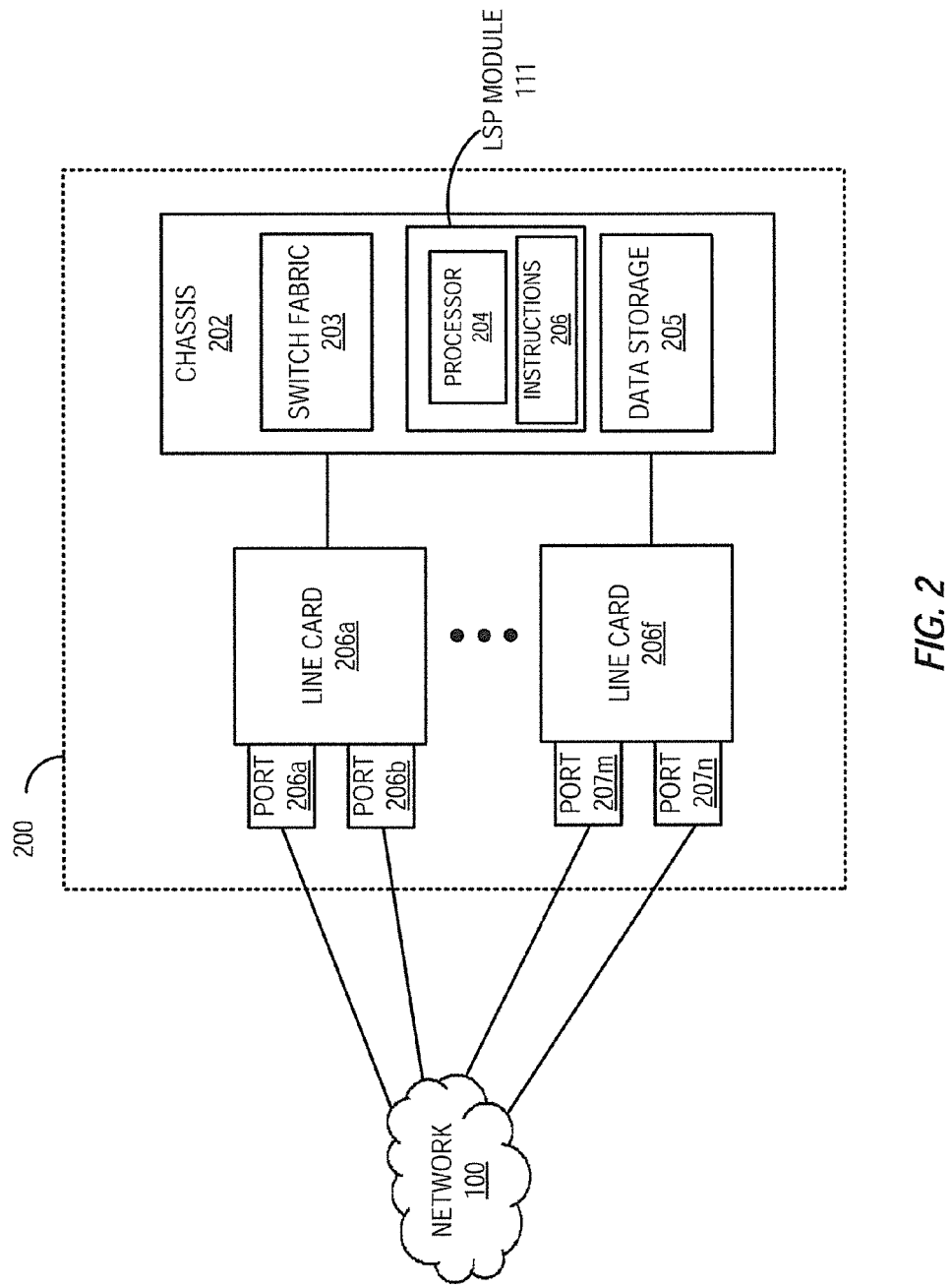
FIG. 2 illustrates an example node.

FIG. 2 illustrates an example of a network switch 200 that may be used as a node in the network 100. The network switch 200 may perform the methods and functions described herein. The network switch 200 may include additional components not shown or some of the components may be removed and/or modified.

The network switch 200 includes ports 207*a-n*. The ports 207*a-n* are configured to receive and send packets in the network 100. The network switch 200 also includes a chassis 202. The chassis 202 includes switch fabric 203, a processor 204, data storage 205, and line cards 206*a-f*. The switch fabric 203 may include a high-speed transmission medium for routing packets between the ports 207*a-n* internally in the network switch 200. The line cards 206*a-f* may store routing and link state information and other information described herein. The line cards 206*a-f* may also control the internal routing and perform other functions described herein. The network switch 200 may be configured to maximize a portion of packet-processing performed on the line cards 206*a-f*. The packets then travel between line-cards via the switch fabric 203. The processor 204 and data storage 205 may be used in cases where the network switch 200 exceeds capacity for processing, or storing data, on the line cards 206*a-f*. The data storage 205 may store the tables for routing and link state information (e.g., a link state table).

Each of the line cards 202*a-f* may include multiple ports and port capacities. Each of the line cards 206*a-f* is connected to the chassis 203. The line cards 206*a-f* may be pluggable line cards that can be plugged into the chassis 203. The chassis 203 may include a plurality of slots (not shown), wherein line-cards 206*a-f* may be inserted as required. For instance, the network switch 200 may have between 4 and 9 slots for inserting line cards as is known for switches deployed in data centers or as network edges. In other instances, the line cards 206*a-f* are non-pluggable and integrated in the network switch 200. In yet another example, the line cards are not used and the processor 204 handles the internal routing between ports. The processor 204 may include an integrated circuit that can perform the routing and other protocol functions described herein.

LSP module 111 is shown in FIG. 2. The LSP module 111 may be an LSP module in any of the nodes 110*a-h*, such as the LSP module 111*a* shown in FIG. 1. The LSP module 111 includes hardware, such as processor 204 to perform the functions and methods described herein. The hardware to perform the functions and methods described herein may include the processor 204 executing machine readable instructions 206, which may be firmware. The machine readable instructions may be stored in a non-transitory computer readable medium, such as the data storage 205 or another data storage in the switch 200, which may be non-volatile. The hardware for the LSP module 111 may include a processor in a line card, which may detect whether a system ID of the network switch changes to invoke sending of the system ID TLV and/or perform other functions described herein.

Figure 3:
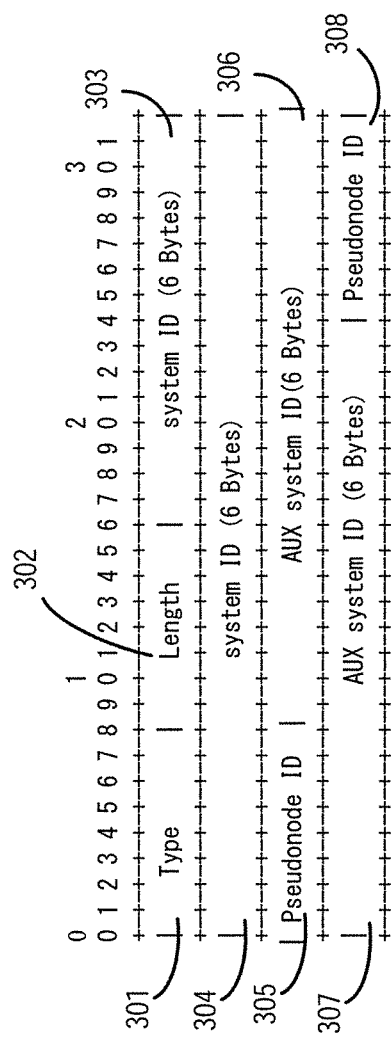
FIG. 3 illustrates an example system ID type-length-value.

FIG. 3 shows an example of the fields in the system ID TLV. As indicated above, the system ID TLV may be sent in the header of a link state protocol data unit. The link state protocol data unit header has a fixed part and a variable part. The fixed part of the header contains fields that are always present, and the variable part of the header can contain TLVs. The system ID TLV is included in the variable part. As shown in FIG. 3, one octet of the system ID TLV identifies the type 301 of the TLV. A value is included in this field that identifies the TLV as a system ID TLV. One octet indicates the length 302 of the value field. The value field includes the system ID field and the auxiliary system ID (AUX system ID) field. The system ID field 303 for example is 6 bytes and the auxiliary system ID field is 6 bytes. On a node where the MAC address is used as the system ID, the system ID field carries the new MAC address, i.e. the changed MAC address, and the auxiliary system ID field 306 carries the old MAC address, i.e., the MAC address before the change. If the system ID and/or the auxiliary system ID represent pseudo nodes, such as virtual nodes, then their pseudo node ID values are included in their respective pseudo node ID fields 305 and 308. Each of the pseudo nodes ID fields is an octet.

Figure 4:
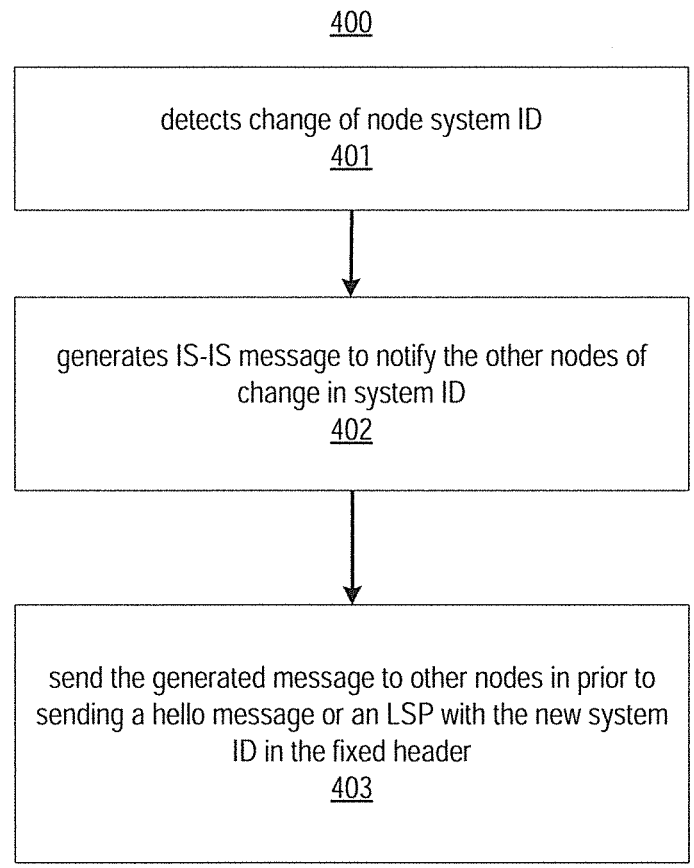
FIG. 4 illustrates an example method for informing nodes of a system ID change.

FIG. 4 illustrates a method 400 to inform of a change of system ID according to an example. At 401, a node in a network, such as the node 110*a* shown in FIG. 1, detects a change of its system ID. The system ID uniquely identifies the node 110*a* in the network 100 or in its area, which may be a level 1 area or a level 2 area in an IS-IS LSP network. For example, an area may include a routing subdomain which maintains routing information about its own internal composition, and also maintains routing information which allows it to reach other routing subdomains. The system ID may be the node's MAC address. Detection of the change of system ID (e.g., MAC address), for example, may be performed by monitoring a storage area in the node storing the MAC address or receiving a notification of the change.

At 402, the node 110*a* generates an IS-IS message to notify the other nodes of its change in system ID. The IS-IS message may be an LSP and/or a hello message. The IS-IS message can include the system ID TLV identifying the old and new system ID. For example, the old MAC address is provided in the auxiliary field of the system ID TLV, the new MAC address is provided in the system field of the system ID TLV, and the old MAC address is provided in the fixed header of the IS-IS message. The other nodes may be nodes in the same area of the node 110*a*.

At 403, the node 110*a* sends the generated message to other nodes in the network 100 prior to sending a hello message or an LSP with the new system ID (e.g., the new MAC address) in the fixed header. For example, after the node sends the IS-IS message generated at 402 to the node 110*b*, the node 110*b* may forward the message to other nodes in the network 100 so the other nodes learn that the node 110*a* changed its system ID. The node 110*a* receives an acknowledgement from one or more of the nodes receiving the IS-IS message. The node 110*a* may then send a hello message or an LSP using its new MAC address in the header and it does not invoke a re-computation of shortest path routes by nodes in the network 100. For example, a topology re-computation may include a re-computation of the SPB network topology among the nodes to determine shortest routing paths based on a link change. A change in MAC address may cause a topology re-computation because other nodes may mistakenly determine that a node or link failed. Instead, the node first notifies other nodes of the new MAC address so when the node sends out an LSP with the new MAC address it is determined to be from the same node.

Figure 5:
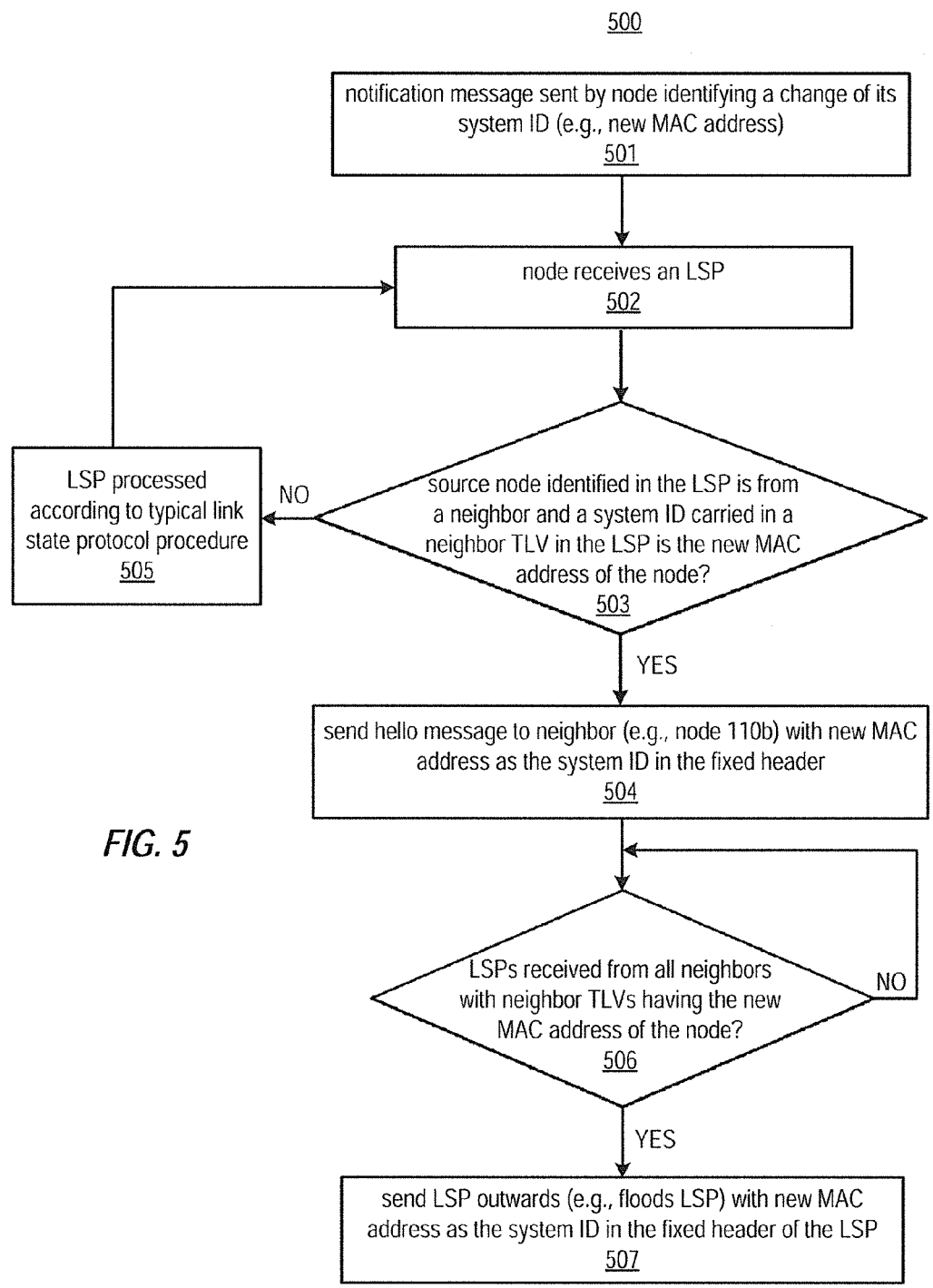
FIG. 5 illustrates another example method for informing nodes of a system ID change.

FIG. 5 illustrates a method 500 to inform nodes of a system ID change according to another example. Some of the blocks are the same or similar to blocks of the method 400.

At 501, a notification message is sent by a first node in the network 100, such as the node 110*a*, identifying a change of its system ID for example to a new MAC address. The notification message may for example be an LSP or hello message including the system ID TLV, such as described with respect to 402 and 403. Nodes receiving the notification message update their link state tables to record the new system ID of the node 110*a* and may forward the notification message to other nodes so the message is flooded.

At 502, the node 110*a* receives an LSP. At 503, the node 110*a* determines whether a source node identified in the LSP is from a neighbor and if a system ID carried in a neighbor TLV in the LSP is the new MAC address of the node 110*a*. For example, the node 110*b*, after receiving the notification message, sends an LSP to the node 110*a* with a neighbor TLV identifying the new MAC address of the node 110*a* as a neighbor of the node 110*b* and including its system ID in the fixed header identifying itself as the source node.

If yes, at 504, the node 110*a* sends a hello message to the neighbor (e.g., node 110*b*) with the new MAC address as the system ID. Because the hello message is sent in a one-to-one manner, so as long as the LSP is received at the node 110*a* indicating that the neighbor updated the new MAC address of the node 110*a* in its link state table, the node 110*a* sends the hello message to the neighbor to maintain a neighboring relationship. If no, at 505, the LSP is processed according to typical link state protocol procedure. For example, if the LSP received at 502 is a hello message and is not from a neighbor then it may be ignored by the node 110*a*. If the LSP received at 502 is a hello message carrying the old MAC address in a neighbor TLV and is from a neighbor, the node 110*a* may re-send a notification message.

At 506, the node 110*a* determines whether LSPs are received from all its neighbors with neighbor TLVs having the new MAC address of the node 110*a*. If yes, at 507, the node 110*a* sends an LSP outwards, for example, floods the LSP, with the new MAC address as the system ID in the fixed header of the LSP.

In another example, at 506, the node 110*a* determines whether all nodes in its area have acknowledged receipt of the notification message. If all the nodes acknowledge receipt, then the node 110*a* sends the LSP in the embodiment of the present invention may use the new bridge MAC address as the system ID to send the LSP outwards, for example, floods the LSP, with the new MAC address as the system ID in the fixed header of the LSP.

While the embodiments have been described with reference to examples, various modifications to the described embodiments may be made without departing from the scope of the claimed features.

What is claimed is:

1. A node in a network implementing an intermediate system to intermediate system (IS-IS) link state protocol, the node comprising:
hardware to detect a change in a media access control (MAC) address of the node resulting in a new MAC address for the node, determine a new system ID of the node from the new MAC address, and inform other nodes in the network of a change of the system ID of the node through an IS-IS message without invoking a re-computation by another node in the network of shortest routing paths.

2. The node of claim 1, wherein the system ID of the node is changed from an old MAC address to the new MAC address, and to inform the other nodes in the network of the change of the system ID, the hardware is to send the IS-IS message to the other nodes and include the old MAC address in a system ID in a fixed header of the IS-IS message and include the new MAC address in a variable header of the IS-IS message.

3. The node of claim 2, wherein the variable header includes a system ID type-length-value (TLV), and the system ID TLV includes the new MAC address in an auxiliary system ID and the old MAC address in a system ID field.

4. The node of claim 3, wherein one of the other nodes receiving the IS-IS message is to compare the system ID in the fixed header to the system ID in the system ID TLV, and if the system IDs are the same, the one of the other nodes is to store the new MAC address of the node as the system ID of the node in a link state table.

5. The node of claim 2, wherein subsequent to sending the IS-IS message, the hardware is to send another IS-IS message to the other nodes, wherein the another IS-IS message includes the new MAC address as the system ID in a fixed header of the another IS-IS message.

6. The node of claim 5, wherein the hardware is to send the another IS-IS message in response to receiving an acknowledgement message from a neighbor node or all the other nodes indicating local link state information for the node is updated to include the new system ID.

7. The node of claim 1, wherein the IS-IS message is a hello message or a link state protocol data unit message.

8. The node of claim 1, wherein the node comprises a layer 2 or a layer 3 network switch.

9. A network switch implementing a link state protocol and using a MAC address of the network switch as a system ID, the network switch comprising:
- ports to send and receive messages in a network;
- a data storage to store link state information; and
- a processor to detect a change in the MAC address from an old MAC address to a new MAC address, send a notification message via at least one of the ports to inform at least one other network switch in the network of a change of system ID of the network switch to a new system ID, and to subsequently send an LSP to other nodes in the network in response to receiving an acknowledgement message from the at least one other network switch acknowledging that the at least one other network switch updated local link state information to include the new system ID.

10. The network switch of claim 9, wherein the LSP includes the new MAC address as a system ID identifying a source of the LSP.

11. The network switch of claim 9, wherein the notification message includes a fixed header identifying a source of the message and a variable header, and the variable header includes the new MAC address.

12. The network switch of claim 11, wherein the variable header includes a system ID TLV, and the system ID TLV includes the new MAC address in an auxiliary system ID and the old MAC address in a system ID field, and the at least one other network switch receiving the notification message is to compare the system ID in the fixed header to the system ID in the system ID TLV to determine whether to perform the update of the local state information.

13. The network switch of claim 9, comprising a layer 2 or a layer 3 network switch.

14. A method of informing nodes of a system ID change in a link state protocol network, the method comprising:
- sending, by a processor of a node in the network, a notification message to inform at least one other node in the network of a change of a system ID of the node to a new system ID;
- subsequently sending from the node an IS-IS protocol message to other nodes in the network in response to receiving an acknowledgement message from the at least one other node acknowledging that the at least one other node updated local link state information to include the new system ID, wherein the LSP includes the new system ID identifying a source of the LSP.

15. The method of claim 14, wherein the sending of the LSP comprises:
- determining whether the acknowledgement message is from a neighbor and includes the new system ID of the node in a neighbor TLV;
- in response to the acknowledgement message being from the neighbor and including the new system ID in the neighbor TLV, sending a hello message to the neighbor, wherein the hello message includes the new system ID in a fixed header; and
- sending an LSP including the new system ID in a fixed header to other nodes in the network in response to receiving LSPs from all the neighbors including the new system ID in a neighbor TLV or in response to receiving LSPs from all the other nodes acknowledging the new system ID is updated in local state information.

* * * * *